US008303174B2

(12) United States Patent
Kasahara

(10) Patent No.: US 8,303,174 B2
(45) Date of Patent: Nov. 6, 2012

(54) TEMPERATURE SENSOR PLAUSIBILITY DIAGNOSIS UNIT AND PLAUSIBILITY DIAGNOSIS METHOD AND INTERNAL COMBUSTION ENGINE EXHAUST PURIFICATION APPARATUS

(75) Inventor: Hiroyuki Kasahara, Saitama (JP)

(73) Assignee: Bosch Corporation, Tokyo (JP)

( * ) Notice: Subject to any disclaimer, the term of this patent is extended or adjusted under 35 U.S.C. 154(b) by 347 days.

(21) Appl. No.: 12/866,570

(22) PCT Filed: Oct. 31, 2008

(86) PCT No.: PCT/JP2008/069873
§ 371 (c)(1),
(2), (4) Date: Aug. 6, 2010

(87) PCT Pub. No.: WO2009/098805
PCT Pub. Date: Aug. 13, 2009

(65) Prior Publication Data
US 2010/0319651 A1    Dec. 23, 2010

(30) Foreign Application Priority Data
Feb. 8, 2008  (JP) ................................. 2008-028650

(51) Int. Cl.
*F01N 11/00*  (2006.01)
*F01N 3/08*   (2006.01)
*G01K 13/00*  (2006.01)
(52) U.S. Cl. .................... 374/144; 374/1; 374/E15.001; 701/30.3
(58) Field of Classification Search ............... 374/1, 144, 374/E15.001; 701/30.2, 30.3, 114; 60/277; 73/1.06; 123/198 R
See application file for complete search history.

(56) References Cited

U.S. PATENT DOCUMENTS

| 5,976,475 | A | 11/1999 | Peter-Hoblyn et al. |
| 7,263,434 | B2* | 8/2007 | Ripper et al. ................. 701/114 |
| 7,418,322 | B2* | 8/2008 | Kariya et al. ................ 701/30.2 |
| 7,429,128 | B2* | 9/2008 | Izumiura et al. .............. 374/144 |
| 7,523,653 | B2* | 4/2009 | Smith et al. ................ 73/114.69 |
| 7,588,368 | B2* | 9/2009 | Hagen et al. .................... 374/40 |
| 8,201,443 | B2* | 6/2012 | Wang et al. ................ 73/114.75 |
| 2005/0102076 | A1 | 5/2005 | Kariya et al. |
| 2006/0120430 | A1* | 6/2006 | Bayerle et al. .................... 374/1 |
| 2009/0143953 | A1* | 6/2009 | Ammineni et al. ........... 701/102 |

FOREIGN PATENT DOCUMENTS

JP    2000220511 A    8/2000

(Continued)

*Primary Examiner* — R. A. Smith
(74) *Attorney, Agent, or Firm* — Michael Best & Friedrich LLP

(57) ABSTRACT

A temperature sensor plausibility diagnosis unit performs plausibility diagnosis of a temperature sensor disposed inside a storage tank in an exhaust purification apparatus of an internal combustion engine that delivers an additive inside the storage tank to an exhaust pipe upstream of a reduction catalyst and selectively reduces and purifies $NO_x$ in the exhaust. The temperature sensor plausibility diagnosis unit includes an additive heat capacity calculating portion that calculates the heat capacity of the additive, a heat quantity variation calculating portion that calculates an increase or decrease in the quantity of heat that the additive receives, and a plausibility diagnosing portion that determines the plausibility of the temperature sensor by comparing an estimated temperature course of the additive estimated from the heat capacity of the additive and the increase or decrease in the quantity of heat with a sensor temperature course of the additive detected by the temperature sensor.

11 Claims, 6 Drawing Sheets

FOREIGN PATENT DOCUMENTS

| | | |
|---|---|---|
| JP | 2002527660 A | 8/2002 |
| JP | 2003254038 A | 9/2003 |
| JP | 2005140069 A | 6/2005 |
| JP | 2011241739 A * | 12/2011 |
| JP | 2011241740 A * | 12/2011 |
| WO | WO0135065 A1 * | 5/2001 |

* cited by examiner

TEMPERATURE SENSOR PLAUSIBILITY DIAGNOSIS UNIT AND PLAUSIBILITY DIAGNOSIS METHOD AND INTERNAL COMBUSTION ENGINE EXHAUST PURIFICATION APPARATUS

TECHNICAL FIELD

The present invention relates to a temperatures sensor plausibility diagnosis unit and plausibility diagnosis method and to an internal combustion engine exhaust purification apparatus. More particularly, the present invention relates to a plausibility diagnosis unit and plausibility diagnosis method that diagnose the plausibility of a temperature sensor disposed inside a storage tank that stores an additive used in exhaust purification and to an internal combustion engine exhaust purification apparatus.

BACKGROUND ART

Nitrogen oxides ($NO_x$), which can have an impact on the environment, are included in exhaust gas emitted from internal combustion engines such as diesel engines. Conventionally, as one aspect of exhaust purification apparatus used for purifying these $NO_x$, there are known SCR (Selective Catalytic Reduction) systems where a selective reduction catalyst is disposed in an exhaust pipe and where reduction and purification of $NO_x$ is performed using an additive in this selective reduction catalyst. These SCR systems deliver an additive such as a urea solution or unburned fuel to the exhaust pipe on the upstream side of the selective reduction catalyst and selectively reduce and purify $NO_x$ in the exhaust gas in the selective reduction catalyst.

Further, in addition to SCR systems using a selective reduction catalyst, there are also known exhaust purification apparatus using a $NO_x$ storage catalyst that stores $NO_x$ in the exhaust gas in a state where the air-fuel ratio of the exhaust gas is lean and releases the $NO_x$ when the air-fuel ratio switches to a rich state. As one aspect of these exhaust purification apparatus, there is an exhaust purification apparatus that directly adds unburned fuel to the upstream side of the $NO_x$ storage catalyst to cause the $NO_x$ stored in the $NO_x$ storage catalyst to be released and uses a hydrocarbon (HC) included in the unburned fuel to perform reduction and purification of the $NO_x$.

Representative examples of devices that deliver the urea solution or unburned fuel used in these exhaust purification apparatus include injection-type additive delivery devices that pressure-feed the additive with a pump and deliver the additive into the exhaust pipe with an injection valve connected to the exhaust pipe. Further, among devices that deliver the urea solution or the like, there are also air assist-type additive delivery devices that use high-pressure air to atomize the urea solution or the like inside a mixing chamber and spray the urea solution into the exhaust pipe via a nozzle connected to the exhaust pipe.

Such additive delivery devices are equipped with a storage tank that stores the additive such as the urea solution or unburned fuel. The additive delivery devices cannot perform delivery control of the additive with good precision when the additive stored inside this storage tank solidifies, so some additive delivery devices are equipped with a temperature sensor inside the storage tank and can detect the temperature of the additive. For example, as an additive delivery device using a urea solution as the additive, there has been disclosed an additive delivery device equipped with an assembly for delivering the urea solution comprising a quality sensor, a temperature sensor, a level sensor and a pump in a storage container (a storage tank) (see patent document Patent Document 1: JP-T-2002-527660 (claim 12, paragraph [0038])

DISCLOSURE OF THE INVENTION

Problem that the Invention is to Solve

Incidentally, configuring exhaust purification apparatus such that they can perform diagnosis of the plausibility of the temperature sensor in order to verify the reliability of the temperature sensor inside the storage tank is now beginning to become mandatory in commercializing exhaust purification apparatus. This is because, for example, in a case where a urea solution is used as the additive, when the reliability of the sensor value of the temperature sensor is low when heating control of the storage tank for preventing crystallization and freezing of the additive is performed, there is the potential for the additive to be excessively heated or conversely for the additive to not be thawed in the time period in which it needs to be thawed. For that reason, a plausibility diagnosis method that can accurately diagnose the plausibility of the temperature sensor is desired.

Thus, the inventor of the present invention made every effort to discover that this problem can be solved by a temperature sensor plausibility diagnosis unit being equipped with a plausibility diagnosing portion that compares an estimated temperature course of an additive estimated by computation with a sensor temperature course of the additive measured by a temperature sensor, and thus the inventor completed the present invention. That is, it is an object of the present invention to provide a temperature sensor plausibility diagnosis unit and plausibility diagnosis method that can accurately perform plausibility diagnosis of a temperature sensor at a desired timing and an exhaust purification apparatus equipped with the plausibility diagnosis unit.

Means for Solving the Problem

According to the present invention, there is provided a temperature sensor plausibility diagnosis unit which, in an exhaust purification apparatus of an internal combustion engine that delivers an additive inside a storage tank to an exhaust pipe on the upstream side of a reduction catalyst and selectively reduces and purifies $NO_x$ in exhaust with the reduction catalyst, is for performing plausibility diagnosis of a temperature sensor disposed inside the storage tank, the temperature sensor plausibility diagnosis unit comprising an additive heat capacity calculating portion that calculates the heat capacity of the additive inside the storage tank, a heat quantity variation calculating portion that calculates an increase or decrease in the quantity of heat that the additive inside the storage tank receives, and a plausibility diagnosing portion that determines the plausibility of the temperature sensor by comparing an estimated temperature course of the additive estimated from the heat capacity of the additive and the increase or decrease in the quantity of heat with a sensor temperature course of the additive detected by the temperature sensor, whereby the problem described above can be solved.

Further, in configuring the temperature sensor plausibility diagnosis unit of the present invention, it is preferred that the heat capacity of the additive is calculated at least on the basis of the residual quantity of the additive inside the storage tank and the specific heat of the additive.

Further, in configuring the temperature sensor plausibility diagnosis unit of the present invention, it is preferred that the increase or decrease in the quantity of heat is calculated on the basis of the quantity of heat that the additive inside the storage tank receives from its surroundings and the quantity of heat that the additive inside the storage tank receives from heating means for heating the additive.

Further, in configuring the temperature sensor plausibility diagnosis unit of the present invention, it is preferred that the quantity of heat that the additive inside the storage tank receives from its surroundings is calculated at least on the basis of the outside air temperature, the shape of the storage tank and the heat transfer coefficient of the storage tank.

Further, in configuring the temperature sensor plausibility diagnosis unit of the present invention, it is preferred that when determination of plausibility by comparison between the estimated temperature course and the sensor value temperature course is a first determination, the plausibility diagnosing portion obtains a difference between a maximum value and a minimum value of the outside air temperature, the exhaust temperature and the temperature of cooling water of the internal combustion engine, performs the first determination when the difference is equal to or greater than a predetermined threshold, and performs a second determination where it determines the plausibility of the temperature sensor by comparing the sensor value of the temperature sensor with the outside air temperature when the difference is less than the predetermined threshold.

Further, another aspect of the present invention is a temperature sensor plausibility diagnosis method which, in an exhaust purification apparatus of an internal combustion engine that delivers an additive inside a storage tank to an exhaust pipe on the upstream side of a reduction catalyst and selectively reduces and purifies $NO_x$ in exhaust with the reduction catalyst, performs plausibility diagnosis of a temperature sensor disposed inside the storage tank, the temperature sensor plausibility diagnosis method comprising determining the plausibility of the temperature sensor by comparing an estimated temperature course of the additive estimated from the heat capacity of the additive inside the storage tank and an increase or decrease in the quantity of heat that the additive inside the storage tank receives with a sensor temperature course of the additive detected by the temperature sensor.

Further, still another aspect of the present invention is an internal combustion engine exhaust purification apparatus comprising any of the temperature sensor plausibility diagnosis units described above.

Advantageous Effects of the Invention

The temperature sensor plausibility diagnosis unit and plausibility diagnosis method of the present invention can accurately determine whether or not the temperature sensor is plausible by considering the quantity of heat imparted to the additive inside the storage tank or taken from the additive to estimate the course of changes in the temperature of the additive and comparing the estimated course of changes in the temperature of the additive with the course of changes in the temperature of the additive actually detected by the temperature sensor. Further, with this diagnosis method, diagnosis can be performed at a desired timing because there are few constraints on the time period in which diagnosis is performed, and the reliability of the plausibility of the temperature sensor can be raised by increasing the number of times of diagnosis.

Further, the exhaust purification apparatus of the present invention is equipped with the plausibility diagnosis unit that can accurately perform plausibility diagnosis of the temperature sensor, so the exhaust purification apparatus can accurately perform control using the sensor value of the temperature sensor inside the storage tank including heating control of the additive.

BEST MODE FOR CARRYING OUT THE INVENTION

Figure 1:
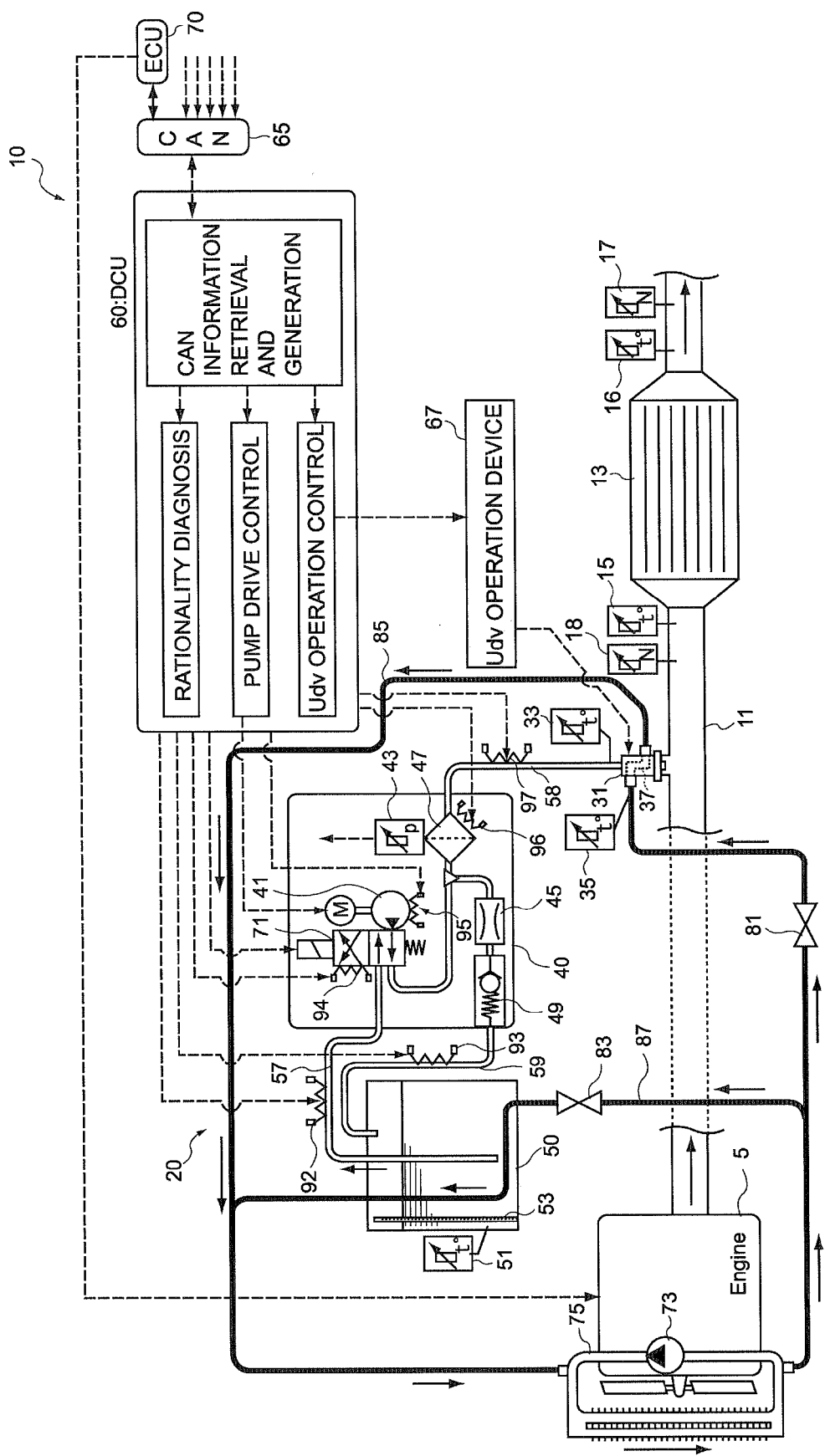
FIG. 1 is a diagram showing a configural example of an exhaust purification apparatus pertaining to an embodiment of the present invention.

An embodiment relating to a temperature sensor plausibility diagnosis unit and plausibility diagnosis method of the present invention and an internal combustion engine exhaust purification apparatus equipped with the plausibility diagnosis unit will be specifically described below with reference to the drawings. However, this embodiment represents one aspect of the present invention, is not intended to limit this invention, and is capable of being arbitrarily altered within the scope of the present invention.

In the drawings, members to which the same reference numerals have been given represent the same members, and description thereof will be appropriately omitted.

1. Exhaust Purification Apparatus

First, the configuration of an internal combustion engine exhaust purification apparatus of the present embodiment equipped with the temperature sensor plausibility diagnosis unit will be described with reference to FIG. 1.

An exhaust purification apparatus 10 shown in FIG. 1 is an exhaust purification apparatus that injects and delivers a urea aqueous solution serving as an additive to the upstream side of a reduction catalyst 13 disposed in an exhaust pipe and selectively reduces and purifies $NO_x$ included in exhaust gas in the reduction catalyst 13. This exhaust purification apparatus 10 includes as its main elements the reduction catalyst 13, which is disposed in an exhaust pipe 11 connected to an internal combustion engine 5 and is for selectively reducing $NO_x$ included in the exhaust gas, and an additive delivery device 20, which includes an additive injection valve 31 for injecting and delivering the additive into the exhaust pipe 11 on the upstream side of the reduction catalyst 13. Further, a temperature sensor 15 and a $NO_x$ sensor 18 are placed on the upstream side of the reduction catalyst 13 in the exhaust pipe 11, and a temperature sensor 16 and a $NO_x$ sensor 17 are placed on the downstream side of the reduction catalyst 13 in the exhaust pipe 11. This exhaust purification apparatus 10 is mainly disposed in an exhaust system of a vehicle, and in the present embodiment also, the exhaust purification apparatus 10 disposed in a vehicle is exemplified.

2. Additive Delivery Device

The additive delivery device 20 disposed in the exhaust purification apparatus 10 of the present embodiment is equipped with the additive injection valve 31 that is fixed to the exhaust pipe 11 on the upstream side of the reduction catalyst 13, a storage tank 50 in which the additive is stored, a pump module 40 that includes a pump 41 that pressure-feeds the additive inside the storage tank 50 to the additive injection valve 31, and a control unit (hereinafter called a DCU (Dosing Control Unit)) 60 that performs control of the additive injection valve 31 and the pump 41 in order to control the dosage of the additive injected and delivered into the exhaust pipe 11. Further, a first delivery passage 58 is connected between the pump module 40 and the additive injection valve 31, a second delivery passage 57 is connected between the storage tank 50 and the pump module 40, and a circulation passage 59 is connected between the pump module 40 and the storage tank 50.

Further, in the example of the exhaust purification apparatus 10 shown in FIG. 1, the DCU 60 is connected to a CAN 65. A control unit (hereinafter called an ECU (Electronic Control Unit)) 70 for controlling the operating state of the internal combustion engine is connected to this CAN 65. Consequently, not only is information relating to the operating state of the internal combustion engine including the fuel injection quantity, the injection timing and the number of revolutions written in the CAN 65, but also information of all sensors and the like disposed in the exhaust purification apparatus 10 is written in the CAN 65. Additionally, the DCU 60 connected to the CAN 65 can read information on the CAN 65 and can output information onto the CAN 65.

In the present embodiment, the ECU 70 and the DCU 60 comprise separate control units and are configured such that they can exchange information via the CAN 65, but the ECU 70 and the DCU 60 may also be configured as one control unit.

Further, the storage tank 50 disposed in the exhaust purification apparatus 10 of the present embodiment is equipped with a temperature sensor 51 for detecting the temperature of the additive inside the tank and a level sensor 53 for detecting the residual quantity of the additive.

Further, as the additive injection valve 31, an ON-OFF valve whose ON-OFF switching is controlled by powering control, for example, is used. The additive pressure-fed from the pump module 40 to the additive injection valve 31 is maintained at a predetermined pressure, and the additive is delivered into the exhaust pipe when the additive injection valve 31 is opened by a control signal sent from the DCU 60.

Further, a cooling water passage 37 is disposed in the additive injection valve 31, and cooling of the additive injection valve 31 is performed utilizing cooling water of the internal combustion engine 5. The additive delivery device 20 in the present embodiment is equipped with a first cooling water circulation passage 85 including the cooling water passage 37 in the additive injection valve 31, and the cooling water of the internal combustion engine 5 is circulated through a cooling water passage 75 in the internal combustion engine 5 by a cooling water circulation pump 73, branches from the cooling water passage 75, and also flows into the first cooling water circulation passage 85. The cooling water flowing into the first cooling water circulation passage 85 passes midstream through the cooling water passage 37 disposed in the additive injection valve 31 and is again returned to the cooling water passage 75 in the internal combustion engine 5, whereby the cooling water cools the additive injection valve 31.

A first cooling water flow rate control valve 81 for regulating the flow rate of the cooling water flowing through the first cooling water circulation passage 85 is disposed upstream of the additive injection valve 31 in this first cooling water circulation passage 85. As the first cooling water flow rate control valve 81, an electromagnetically controlled ON-OFF valve or an electromagnetic proportional flow rate control valve, for example, is used, and the opening and closing of these valves is controlled by the DCU 60 described later. This first cooling water flow rate control valve 81 is always open, and the additive injection valve 31 is cooled by the cooling water circulating therethrough. On the other hand, when there is the potential for the additive injection valve 31 to be overcooled, the first cooling water flow rate control valve 81 is controlled such that the first cooling water flow rate control valve 81 is closed to shut off circulation of the cooling water or such that the opening degree of the first cooling water flow rate control valve 81 is made smaller to reduce the flow rate of the cooling water, so that the additive injection valve 31 is not overcooled.

Further, a temperature sensor 33 for detecting the temperature of the additive flowing into the fuel injection valve 31 is disposed in a portion of the first delivery passage 58 connected to the additive injection valve 31 near an inlet of the additive injection valve 31. Moreover, a temperature sensor 35 for detecting the temperature of the cooling water flowing into the additive injection valve 31 is disposed in a portion of the first cooling water circulation passage 85 on an upstream-side inlet of the additive injection valve 31. The sensor values detected by these temperature sensors 33 and 35 are sent to the DCU 60.

Further, in the additive delivery device 20 disposed in the exhaust purification apparatus of the present embodiment, a second cooling water circulation passage 87 is disposed branching from the upstream side of the first cooling water flow rate control valve 81 in the first cooling water circulation passage 85 that branches from the cooling water passage 75 in the internal combustion engine 5. This second cooling water circulation passage 87 is disposed so as to pass through the inside of the storage tank 50 and again merges with the first cooling water circulation passage 85. Further, a second cooling water flow rate control valve 83 for regulating the flow rate of the cooling water flowing through the second cooling water circulation passage 87 is disposed on the upstream side of the storage tank 50 in the second cooling water circulation passage 87.

The cooling water of the internal combustion engine 5 circulating through this second cooling water circulation passage 87 is utilized as heating means for heating the additive inside the storage tank 50. The cooling water of the internal combustion engine 5 is maintained at about 70 to 80° C., for example, and when the temperature of the additive inside the storage tank 50 drops, the second cooling water flow rate control valve 83 is controlled such that the second cooling water flow rate control valve 83 is opened to circulate the cooling water inside the second cooling water circulation passage 87, so that the temperature of the additive does not drop excessively and so that the additive does not freeze.

In regard to the second cooling water flow rate control valve 83 also, like the first cooling water flow rate control valve 81, an electromagnetically controlled ON-OFF valve or an electromagnetic proportional flow rate control valve is used, and the opening and closing of these valves is controlled by the DCU 60. That is, as described above, the temperature sensor 51 is disposed in the storage tank 50 in which the additive is stored, the value detected by the temperature sensor 51 is outputted to the DCU 60 as a signal, and control to open and close the second cooling water flow rate control valve 83 is performed on the basis of this sensor value.

Further, the pump module 40 is equipped with the pump 41, and the pump 41 pumps the additive inside the storage tank 50 via the second delivery passage 57 and pressure-feeds the additive to the additive injection valve 31 via the first delivery passage 58. This pump 41 comprises a motor-driven diaphragm pump or gear pump, for example, and is duty-controlled by a signal sent from the DCU 60. Further, a pressure sensor 43 is disposed in the first delivery passage 58, the value detected by the pressure sensor 43 is outputted to the DCU 60 as a signal, and the drive duty of the pump 41 is controlled such that the pressure value inside the first delivery passage 58 is maintained at a predetermined value. That is, the pump 41 is controlled such that its drive duty becomes larger in a state where the pressure inside the first delivery passage 58 drops below the predetermined value, and the pump 41 is controlled such that its drive duty becomes smaller in a state where the pressure inside the first delivery passage 58 rises above the predetermined value.

The "drive duty of the pump" means the percentage of pump drive time occupying one cycle in PWM (pulse width modulation) control.

Further, a main filter 47 is disposed in the first delivery passage 58, and foreign matter in the additive pressure-fed to the additive injection valve 31 is trapped therein. Further, the circulation passage 59 is disposed branching from the first delivery passage 58 between the pump 41 and the main filter 47, and this circulation passage 59 is connected to the storage tank 50. In this circulation passage 59, an orifice 45 is disposed and also a pressure control valve 49 is disposed on the storage tank 50 side of the orifice 45. Because the additive delivery device 20 is equipped with this circulation passage 59, the pressure control valve 49 opens and some of the additive is refluxed back inside the storage tank 50 when the pressure value inside the first delivery passage 58 exceeds the predetermined value in a state where the additive is pressure-fed by the pump 41 that is feedback-controlled on the basis of the detection value of the pressure sensor 43. As the pressure control valve 49, for example, a publicly known check valve or the like is used.

Further, the pump module 40 is equipped with a reverting valve 71, and when the additive delivery device 20 does not perform delivery control of the additive, the additive in the additive delivery system including the pump module 40, the additive injection valve 31, the first delivery passage 58 and the second delivery passage 57 is recovered in the storage tank 50. Consequently, under temperature conditions where the additive easily freezes, such as when it is cold outside, freezing and crystallization of the additive inside the additive delivery system is prevented when the internal combustion engine 5 stops and control of the additive delivery device 20 is not performed, and when operation of the internal combustion engine is resumed thereafter, it is ensured that there are no injection defects resulting from clogging.

This reverting valve 71 is, for example, a switching valve having the function of switching the flow path of the additive from a forward direction from the storage tank 50 to the pump module 40 to a reverse direction from the pump module 40 to the storage tank 50. When the ignition switch of the internal combustion engine is switched OFF, the reverting valve 71 switches the flow path to the reverse direction and the pump 41 is driven, whereby the additive is recovered inside the storage tank 50.

Further, heaters 92 to 97 are disposed in respective sites in the additive delivery system of the additive delivery device 20. These heaters 92 to 97 are disposed in order to prevent a situation where, when the additive exists inside the additive delivery system such as when it is cold outside, the additive freezes such that the additive delivery system becomes partially or completely blocked and delivery control of the additive by the additive injection valve 31 is no longer accurately performed. Further, these heaters 92 to 97 are powered and controlled by the DCU 60. For example, power is supplied from a battery and the additive is heated when it is judged that the additive is under a temperature condition where it will freeze in the additive delivery system on the basis of the temperature of the additive and the outdoor air temperature.

These heaters 92 to 97 are not particularly limited; for example, electrical heating wires are used.

3. Control Unit (Temperature Sensor Plausibility Diagnosis Unit) of Additive Delivery Device (1) Basic Configuration The DCU 60 disposed in the exhaust purification apparatus 10 shown in FIG. 1 basically performs operation control of the pump 41 and the additive injection valve 31 on the basis of various information existing on the CAN 65 such that an appropriate quantity of the additive is delivered into the exhaust pipe 11. Further, the DCU 60 in the embodiment of the present invention is also equipped with a function as a plausibility diagnosis unit that diagnoses the plausibility of the temperature sensor 51 disposed in the storage tank 50.

FIG. 1 shows a configural example where portions relating to operation control of the additive injection valve 31 and drive control of the pump 41 and also plausibility diagnosis of the temperature sensor 51 are shown in functional blocks. This DCU 60 includes as its main components a CAN information retrieving and generating portion (in FIG. 1, written as "CAN information retrieval and generation"), a pump drive control portion (in FIG. 1, written as "pump drive control"), an additive dosage instructing portion (in FIG. 1, written as "Udv operation control"), and a plausibility diagnosing portion (in FIG. 1, written as "plausibility diagnosis"). Each of these portions is specifically realized by the execution of programs by a microcomputer (not shown).

Of these, the CAN information retrieving and generating portion reads, and outputs to each of the portions, information existing on the CAN 65 including information relating to the operating state of the internal combustion engine 5 outputted from the ECU 70 and the sensor values outputted from the temperature sensors and the $NO_x$ sensors. In particular, in the DCU 60 disposed in the exhaust purification apparatus of the present embodiment, exhaust temperature information detected by the temperature sensor 15 disposed in the exhaust pipe 11 on the upstream side of the reduction catalyst 13, cooling water temperature information of the internal combustion engine 5 detected by a temperature sensor (not shown) disposed in the internal combustion engine 5, outside air temperature information detected by a temperature sensor (not shown) disposed in the vehicle, temperature information of the additive detected by the temperature sensor 51 disposed inside the storage tank 50, residual quantity information of the additive detected by the level sensor 53 disposed inside the storage tank 50, and vehicle velocity information detected by a vehicle velocity sensor (not shown) disposed in the vehicle are transmitted to the plausibility diagnosing portion via the CAN information retrieving and generating portion.

Further, the pump drive control portion continuously reads the sensor value of the pressure sensor 43 representing the pressure of the additive inside the second delivery passage 57 outputted from the CAN information retrieving and generating portion, feedback-controls the pump 41 on the basis of this sensor value, and performs control to maintain the pressure inside the second delivery passage 57 in a substantially constant state. For example, in a case where the pump 41 is a motor-driven pump, when the outputted pressure value is lower than a target value, the pump drive control portion performs control of the motor-driven pump such that its duty ratio becomes larger in order to raise the pressure, and conversely when the outputted pressure value exceeds the target value, the pump drive control portion performs control of the motor-driven pump such that its duty ratio becomes smaller in order to lower the pressure.

The additive dosage instructing portion reads information relating to the additive inside the storage tank 50, the exhaust gas temperature, the reduction catalyst temperature, information relating to the concentration of $NO_x$ on the downstream side of the reduction catalyst, and information relating to the operating state of the internal combustion engine 5, all of which are outputted from the CAN information retrieving and generating portion, and calculates the dosage of the additive such that a quantity of ammonia that is needed in order to reduce $NO_x$ included in the exhaust gas is generated. Further, the additive dosage instructing portion outputs a control signal to an additive injection valve operation device (in FIG. 1, written as "Udv operation device") 67 for operating the additive injection valve 31 such that the calculated dosage of the additive is injected.

(2) Additive Delivery Control

Reduction and purification of $NO_x$ in the exhaust gas by the exhaust purification apparatus 10 shown in FIG. 1 is performed as follows.

When the internal combustion engine 5 is operating, the additive inside the storage tank 50 is pumped by the pump 41 and pressure-fed to the additive injection valve 31. At this time, feedback control of the pump 41 is performed depending on the sensor value of the pressure sensor 43 on the downstream side of the pump 41 disposed in the pump module 40. For example, the output of the pump 41 is raised when the sensor value is less than the predetermined value, and the additive is depressurized by the pressure control valve 49 when the pressure value exceeds the predetermined value. Thus, the pressure of the additive pressure-fed to the additive injection valve 31 is maintained at a substantially constant value.

At this time, the temperature of the additive inside the storage tank 50 is detected by the temperature sensor 51, and when the temperature of the additive is a low temperature less than 60° C., for example, the cooling water of the internal combustion engine is allowed to flow inside the second cooling water circulation passage 87 and the additive is heated. Thus, freezing of the additive is prevented, it becomes easier for the additive delivered into the exhaust pipe 11 to quickly undergo hydrolysis, and it becomes easier for ammonia to be generated.

In a state where the additive is delivered at a substantially constant pressure, the DCU 60 decides the quantity of the additive that should be supplied on the basis of information such as the operating state of the internal combustion engine, the exhaust temperature, the temperature of the reduction catalyst 13, and the concentration of $NO_x$ that has passed through the reduction catalyst 13 without being reduced which is measured on the downstream side of the reduction catalyst 13, generates a control signal corresponding thereto, and outputs the control signal to the additive injection valve operation device 67. Then, control to open and close the additive injection valve 31 is performed by the additive injection valve operation device 67, and an appropriate quantity of the additive is delivered into the exhaust pipe 11. The additive delivered into the exhaust pipe 11 flows into the reduction catalyst 13 in a state where the additive is mixed with the exhaust gas, and the additive is used in the reduction reaction of $NO_x$ included in the exhaust gas. In this manner, purification of the exhaust gas is performed.

(3) Temperature Sensor Plausibility Diagnosing Portion

Here, the OCU 60 disposed in the exhaust purification apparatus of the present embodiment is equipped with the temperature sensor plausibility diagnosing portion.

Figure 2:
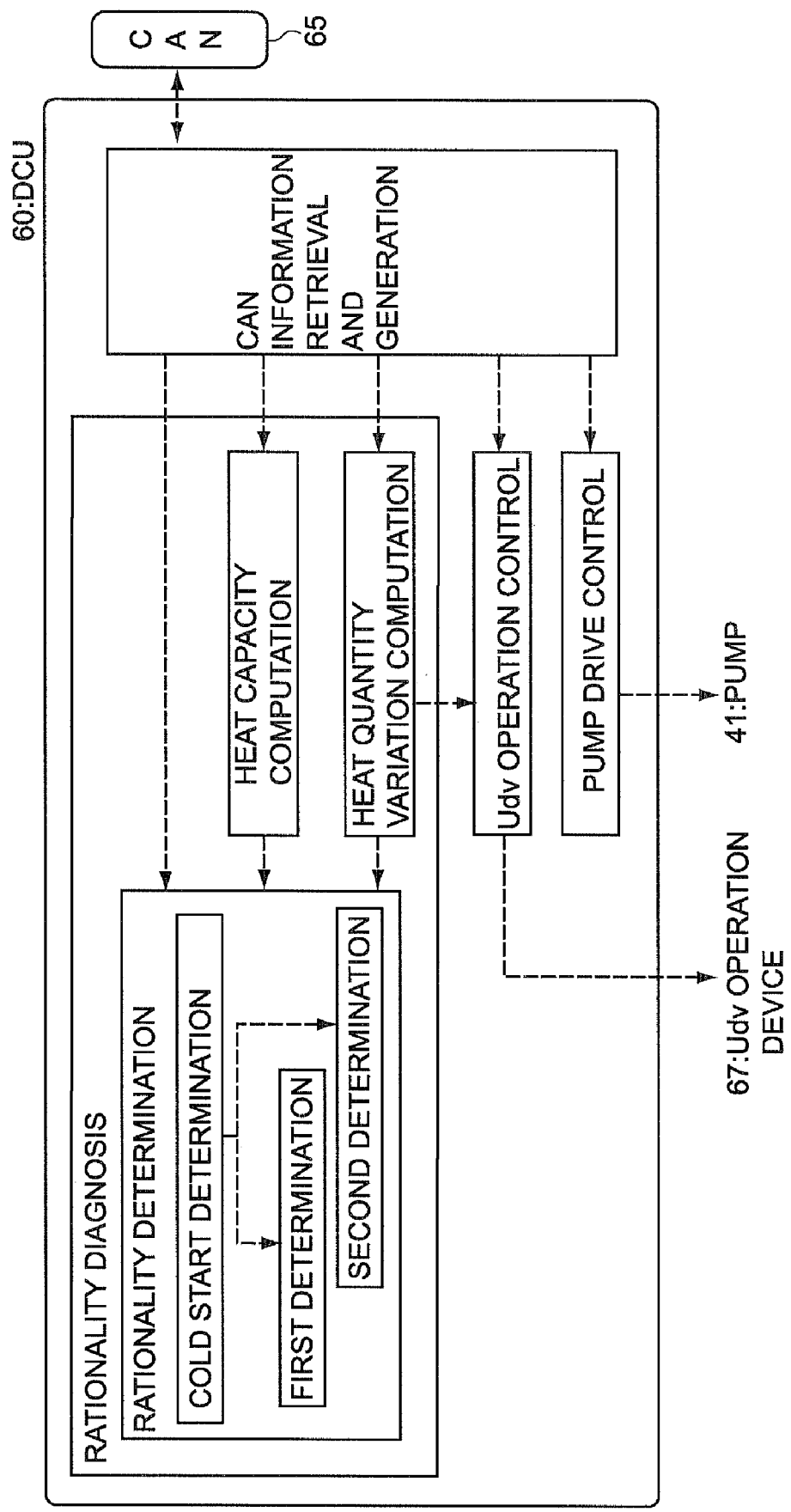
FIG. 2 is a block diagram showing a configural example of a control unit (DCU) of an additive delivery device equipped with a temperature sensor plausibility diagnosing portion.

FIG. 2 shows in greater detail the configuration of the temperature sensor plausibility diagnosing portion of the configuration of the DCU 60. This plausibility diagnosing portion is configured from an additive heat capacity calculating portion (in FIG. 2, written as "heat capacity calculation"), a heat quantity variation calculating portion (in FIG. 2, written as "heat quantity variation calculation"), and a plausibility determining portion (in FIG. 2, written as "plausibility determination"). Each of these portions is also specifically realized by the execution of programs by a microcomputer (not shown).

Of these, the additive heat capacity calculating portion is a portion that calculates the heat capacity of the additive stored inside the storage tank. Assuming that m represents the mass of the additive and that cp represents specific heat of the additive, the heat capacity Cp of the additive is expressed by expression (1) below.

$$Cp = cp \cdot m \quad (1)$$

Here, in the configural example of the exhaust purification apparatus of the present embodiment, the mass m of the additive is calculated on the basis of the shape of the storage tank stored beforehand and the sensor value of the level sensor disposed in the storage tank. Specifically, assuming that a represents a shape constant based on the shape of the storage tank and that L represents the sensor value of the level sensor, the mass m of the additive is calculated using expression (2) below.

$$m = \alpha \cdot L \quad (2)$$

Consequently, in the additive heat capacity calculating portion of the DCU disposed in the exhaust purification apparatus of the present embodiment, the heat capacity Cp of the additive inside the storage tank is obtained using expression (3) below, which is obtained by assigning expression (2) to expression (1).

$$Cp = cp \cdot \alpha \cdot L \quad (3)$$

But in the case of an exhaust purification apparatus with a configuration not equipped with the level sensor inside the storage tank, an estimated value of the mass of the additive obtained by subtracting the use quantity (m2) from the replenishment quantity (m1) can be used instead of using the information of the shape of the storage tank and the sensor value of the level sensor. In this case, expression (1) is expressed by expression (4) below.

$$Cp = cpF \cdot (m1 - m2) \quad (4)$$

Further, the heat quantity variation calculating portion is a portion that calculates an increase or decrease in the quantity of heat that the additive stored inside the storage tank receives. In the configural example of the exhaust purification apparatus of the present embodiment, the increase or decrease in the quantity of heat that the additive receives is obtained by computation on the basis of the quantity of heat that the additive receives from the surroundings of the storage tank, the quantity of heat that the additive receives from the heating means that heats the additive in the storage tank, and the heat capacity of the additive obtained by the additive heat capacity calculating portion.

The quantity of heat that the additive inside the storage tank receives from its surroundings can be obtained by computation on the basis of the vehicle velocity information of the vehicle and the outside air temperature information transmitted from the CAN information retrieving and generating portion and the shape of the storage tank and the heat transfer coefficient of the storage tank.

Further, the quantity of heat that the additive inside the storage tank receives from the heating means can also be obtained by computation. The additive heating means disposed in the exhaust purification apparatus of the present embodiment is configured to allow the cooling water of the internal combustion engine to circulate and heat the additive inside the storage tank via a heat exchanger disposed in the storage tank. For that reason, in the heat quantity variation calculating portion, the increase or decrease in the quantity of heat that the additive receives is obtained on the basis of the flow rate of the cooling water flowing inside the second cooling water passage, the cooling water temperature information transmitted from the CAN information retrieving and generating portion, the temperature information of the heat exchanger, and the specific heat of the cooling water.

Specifically, assuming that S1 represents the surface area of a cooling water passage touching the heat exchanger, S2 represents the surface area of the heat exchanger touching the additive, $\alpha 1$ represents thermal conductivity from the cooling water to the heat exchanger, $\alpha 2$ represents thermal conductivity from the heat exchanger to the additive, Tc represents the cooling water temperature, Tw represents the heat exchanger temperature, and Tu represents the additive temperature, the increase or decrease in the quantity of heat that the additive receives dQ is expressed by expression (5) below.

$$dQ = \alpha 1 \cdot (Tc - Tw) \cdot S1 + \alpha 2 \cdot (Tw - Tu) \cdot S2 \quad (5)$$

Of these, the thermal conductivity from the cooling water to the heat exchanger ($\alpha 1$) is a value dependent on the flow rate of the cooling water.

In this expression, if S1=S2 and $\alpha 1 = \alpha 2$, then the increase or decrease in the quantity of heat that the additive receives dQ would be expressed by expression (6) below.

$$dQ = \alpha 1 \cdot (Tc - Tu) \cdot S1 \quad (6)$$

But the method of calculating the quantity of heat that the additive receives from the heating means is not limited to the example described above. For example, when other heating means such as an electric heater is used, the method can be set to calculate the quantity of heat that the additive receives from the heating means on the basis of the performance and use conditions of the heating means that is used.

The increase or decrease in the quantity of heat that the additive inside the storage tank receives is obtained by adding the quantity of heat that the additive receives from its surroundings to the quantity of heat that the additive inside the storage tank receives from the heating means.

Further, the plausibility determining portion is a portion that performs plausibility diagnosis of the temperature sensor disposed inside the storage tank. In the plausibility diagnosis unit disposed in the exhaust purification apparatus of the present embodiment, the plausibility determining portion is configured such that it can perform a first determination and a second determination whose determination methods differ depending on whether or not the internal combustion engine starts at a low temperature.

Of these, in a first determining portion that performs the first determination, diagnosis of the plausibility of the sensor value of the temperature sensor is performed as a result of the heat capacity of the additive obtained by the additive heat capacity calculating portion and the increase or decrease in the quantity of heat that the additive receives obtained by the heat quantity variation calculating portion being compared with a temperature course of the additive that is continuously stored in an unillustrated RAM (Random Access Memory) and estimated and the course of the value actually detected by the temperature sensor disposed in the storage tank. That is, the first determining portion diagnoses the plausibility of the temperature sensor by seeing whether a temperature change curve estimated from the increase or decrease in the quantity of heat that the additive receives and a change curve of the sensor value of the temperature sensor approximate each other.

It is possible for this first determining portion to perform plausibility diagnosis of the temperature sensor under all situations, but when the internal combustion engine is stopped a long time, that is, when the internal combustion engine or the exhaust purification apparatus is at a low temperature, the temperature inside the storage tank should approximate the outside air temperature, and plausibility diagnosis of the temperature sensor can also be simply and conveniently performed by simply comparing the sensor value resulting from the temperature sensor with the outside air temperature after the internal combustion engine has been stopped a long time. For that reason, the plausibility diagnosing portion disposed in the exhaust purification apparatus of the present embodiment is equipped with a second determining portion that performs determination differing from the first determination. In the second determining portion, diagnosis of the plausibility of the sensor value resulting from the temperature sensor is performed by comparing the sensor value detected by the temperature sensor disposed inside the storage tank with the outside air temperature, which are transmitted from the CAN information retrieving and generating portion, in a state where the internal combustion engine has been stopped a long time.

That is, the plausibility diagnosing portion disposed in the exhaust purification apparatus of the present embodiment is configured to perform the second determination where it diagnoses the plausibility of the temperature sensor by simply comparing the sensor value resulting from the temperature sensor with the outside air temperature when the internal combustion engine has been stopped a long time and to perform the first determination where it compares the estimated temperature change with the change in the sensor value of the temperature sensor when the internal combustion engine has not been stopped a long time.

When the plausibility diagnosing portion is configured in this manner, diagnosis can be performed simply and conveniently in a short amount of time when the internal combustion engine is started at a low temperature, and diagnosis is performed at a desired timing even under situations where the temperature of the internal combustion engine is rising.

In the plausibility diagnosing portion disposed in the exhaust purification apparatus of the present embodiment, a low-temperature start determining portion (in FIG. 2, written as "cold start determination") that determines whether or not the internal combustion engine is starting at a low temperature discerns whether or not the internal combustion engine is starting at a low temperature by determining whether a difference $\Delta T_1$ between a maximum value and a minimum value of the outside air temperature, the temperature of the exhaust on the upstream side of the reduction catalyst and the cooling water temperature transmitted from the CAN information retrieving and generating portion is equal to or less than a threshold $\Delta T_1 0$. This is because when the internal combustion engine is stopped a long time or more, the outside air temperature, the exhaust temperature and the cooling water temperature become values that approximate each other.

But the method of determining whether or not the internal combustion engine is starting at a low temperature is not limited to this example. For example, in the present embodiment, the value of the temperature sensor on the upstream side of the reduction catalyst is used as the exhaust temperature, but the value of the temperature sensor on the downstream side of the reduction catalyst may also be used as the exhaust temperature, or information relating to still another exhaust temperature may also be used.

4. Plausibility Diagnosis Method (1) Specific Example of Plausibility Determination of Temperature Sensor Next, a specific example of the first determination where the plausibility diagnosis unit disposed in the exhaust purification apparatus of the present embodiment determines the plausibility of the temperature sensor by comparing the course of the sensor value of the temperature sensor disposed inside the storage tank with an estimated temperature course will be described in detail with reference to FIG. 3.

Figure 3:
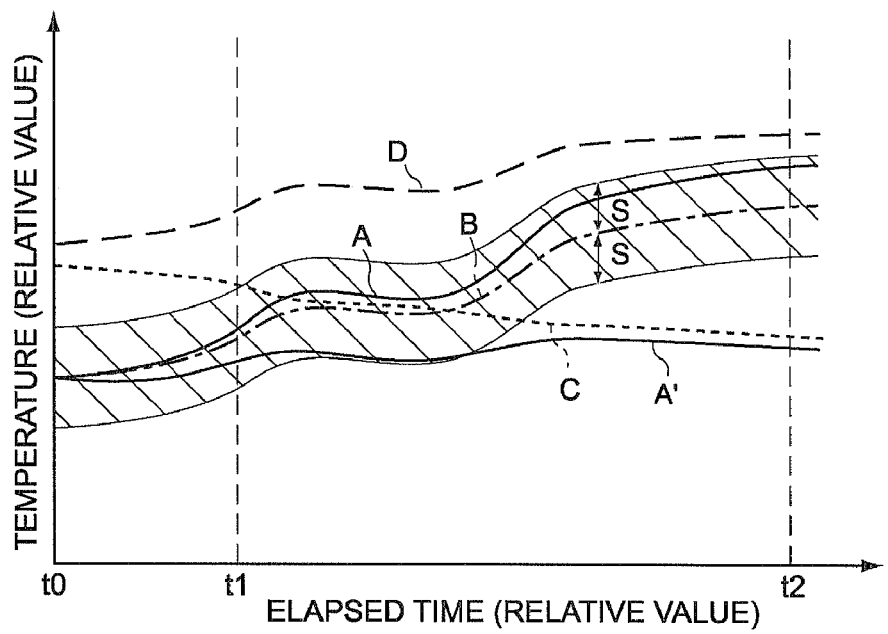
FIG. 3 is a diagram for describing a specific example of a first determination where the plausibility of a temperature sensor is diagnosed.

FIG. 3 shows an estimated temperature course of the additive inside the storage tank and a course of the sensor value of the temperature sensor disposed in the storage tank. In FIG. 3, the vertical axis represents temperature (relative value), the horizontal axis represents elapsed time (relative value), and courses of the outside air temperature (dotted line C), the cooling water temperature (broken line D), the value of the temperature sensor on the upstream side of the reduction catalyst (solid line A) and the estimated temperature of the additive (one-dotted chain line B) are respectively shown. Further, the outside air temperature (dotted line C), the cooling water temperature (broken line D) and the temperature sensor value (solid line A) are shown reflecting relative temperatures, but the value of the estimated temperature (one-dotted chain line B) at t0 is caused to coincide with the temperature sensor value (solid line A).

In this example in FIG. 3, as the outside air temperature (dotted line C) gradually drops as time elapses, the cooling water temperature (broken line D) gradually rises and the course of the sensor value (solid line A) detected by the temperature sensor also rises in a graduated manner. The change curve of this temperature sensor value (solid line A) does not completely coincide with the change curve of the estimated temperature of the additive inside the storage tank (one-dotted chain line B), but in the time period from t1 to t2 when diagnosis is being performed, the absolute value of the difference between the temperature sensor value and the estimated temperature is equal to or less than a threshold S and the change curves approximate each other, so it is determined that the temperature sensor is plausible. On the other hand, when the absolute value of the difference between the temperature sensor value and the estimated temperature exceeds S in the time period from t1 to t2 when diagnosis is being performed, as indicated by solid line A', it is determined that the temperature sensor is not plausible.

Further, in this example in FIG. 3, the time period from when monitoring of the temperature course is started until a predetermined amount of time elapses (the time period from t0 to t1) is standby time, and diagnosis is not started during that time period. This is because, at the point in time to, the temperature sensor value and the estimated temperature coincide, so immediately after monitoring of the temperature course is started, the potential for the difference between the temperature sensor value and the estimated temperature to become large is small and it is difficult to accurately determine the plausibility of the temperature sensor. Further, when the amount of elapsed time is short, it is also conceivable to make the threshold S smaller, but when the threshold S is made smaller, the probability of misdiagnosis becomes higher and the reliability of the diagnosis result drops.

Further, the length of the time period (the amount of time from t1 to t2) in which diagnosis to compare the change curve of the estimated temperature (one-dotted chain line B) with the change curve of the temperature sensor value (solid line A) is performed is set to be 60 to 600 seconds, for example, but it is not particularly limited. However, when the diagnosis time period is long, the reliability of the diagnosis result is raised, but when the diagnosis time period is excessively long, more time is required for diagnosis and the potential for diagnosis to be interrupted midway becomes higher.

(2) Flow of Plausibility Diagnosis

Next, one example of a specific routine of the temperature sensor plausibility diagnosis method will be described with reference to the flowcharts of FIG. 4 to FIG. 6. This routine may be executed all the time or maybe executed by interruption every certain amount of time. But the higher the number of times is, the more reliability with respect to the plausibility of the temperature sensor is raised.

First, in step S10, the outside air temperature To, the temperature of the exhaust on the upstream side of the reduction catalyst Tg and the temperature of the cooling water of the internal combustion engine Tc are read. Next, in step S11, discernment of whether or not the difference $\Delta T_1$ between the maximum value and the minimum value of the outside air temperature To, the exhaust temperature Tg and the cooling water temperature Tc read in step S10 is less than the predetermined threshold $\Delta T_1 0$ is performed.

In step S11, when the subtracted value $\Delta T_1$ is less than the threshold $\Delta T_1 0$, the outside air temperature To, the exhaust temperature Tg and the cooling water temperature Tc approximate each other and it is estimated that the internal combustion engine is starting at a low temperature after it had been stopped a long time, and the routine proceeds to a step of the second determination where the plausibility diagnosis unit simply and conveniently performs plausibility diagnosis. On the other hand, in step S11, when the difference $\Delta T_1 1$ between the maximum value and the minimum value of the three temperatures is equal to or greater than the threshold $\Delta T_1 0$, it is estimated that the internal combustion engine is not starting at a low temperature after it had been stopped a long time, and the routine proceeds to a step of the first determination where the plausibility diagnosis unit compares the change curves of the temperature courses.

When the second determination is performed, first, in step S12, the sensor value of the temperature sensor Tu and the outside air temperature To are read, and in step S13 thereafter, it is discerned whether or not an absolute value $\Delta T_2$ of the difference between the sensor value of the temperature sensor Tu and the outside air temperature To is less than a predetermined threshold $\Delta T_2 0$. Then, when the absolute value $\Delta T_2$ is less than the threshold $\Delta T_2 0$, it is determined that the temperature sensor is plausible, and when the absolute value $\Delta T_2$ is equal to or greater than the threshold $\Delta T_2 0$, it is determined that the temperature sensor is not plausible.

On the other hand, when the first determination is performed, first, in step S14, the sensor value of the level sensor L is read, and in step S15 thereafter, the heat capacity of the additive inside the storage tank is calculated on the basis of the shape constant based on the shape of the storage tank stored beforehand and the specific heat of the additive.

Next, in step S16, the sensor value of the vehicle velocity sensor of the vehicle S and the outside air temperature To are read, and in step S17 thereafter, the increase or decrease in the quantity of heat that the additive receives from the surroundings of the storage tank is obtained on the basis of the shape of the storage tank stored beforehand and the heat transfer coefficient of the storage tank.

Moreover, in step S18, the flow rate of the cooling water flowing inside the second cooling water passage Vc, the cooling water temperature Tc and the temperature of the heat exchanger Tw are read, and in step S19 thereafter, the increase or decrease in the quantity of heat that the additive receives from the heating means is obtained on the basis of the specific heat of the cooling water and the heat transfer coefficient of the heat exchanger stored beforehand.

Thereafter, in step S20, the temperature change curve of the additive estimated on the basis of the heat capacity of the additive obtained in step S15, the increase or decrease in the quantity of heat that the additive receives from the surroundings of the storage tank obtained in step S17 and the increase or decrease in the quantity of heat that the additive receives from the heating means obtained in step S19 is compared with the change curve of the sensor value of the temperature sensor Tu, and it is discerned whether or not the change curves approximate each other. Then, as described above, when it is discerned that the change curve of the sensor value of the temperature sensor Tu and the change curve of the estimated temperature approximate each other, it is determined that the temperature sensor is plausible, and when it is discerned that the change curve of the sensor value of the temperature sensor Tu and the change curve of the estimated temperature do not approximate each other, it is determined that the temperature sensor is not plausible.

The temperature sensor plausibility diagnosis unit disposed in the exhaust purification apparatus of the present embodiment described above can perform plausibility diagnosis of the temperature sensor at a desired timing regardless of the operating state of the internal combustion engine by diagnosing the plausibility of the temperature sensor by comparing the change curve of the sensor value of the temperature sensor inside the storage tank with the change curve of the estimated temperature estimated from the increase or decrease in the quantity of heat that the additive inside the storage tank receives.

(3) Applied Example

Figure 7:
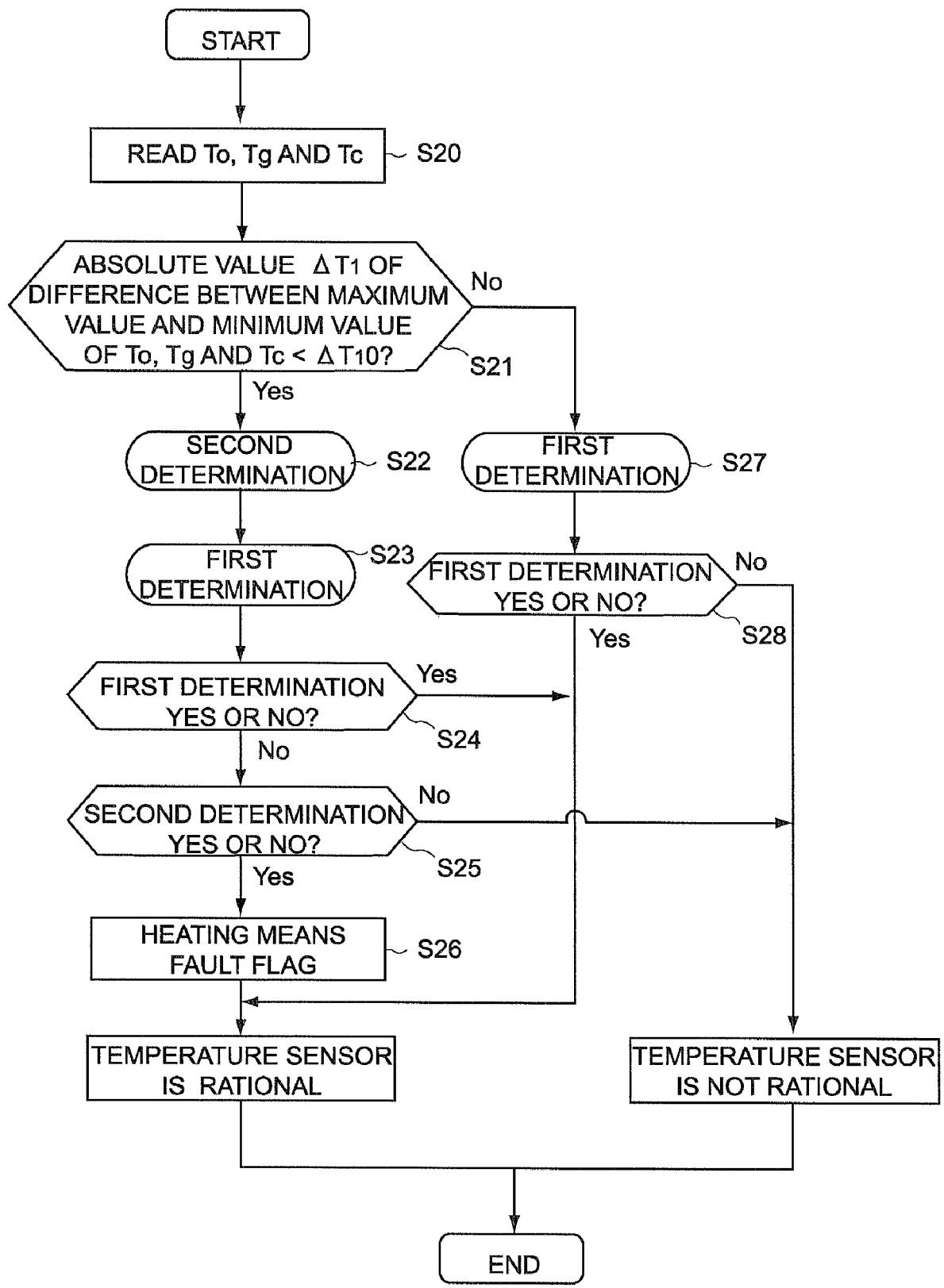
FIG. 7 is a flowchart for describing an applied example of a temperature sensor plausibility diagnosis method.

The example described up to now has been a basic example where the plausibility diagnosis unit performs plausibility diagnosis of the temperature sensor by performing the first determination or the second determination depending on whether or not the internal combustion engine is starting at a low temperature, but an applied example where the plausibility diagnosis unit performs the first determination after performing the second determination when the internal combustion engine starts at a low temperature will be described below on the basis of FIG. 7.

Figure 4:
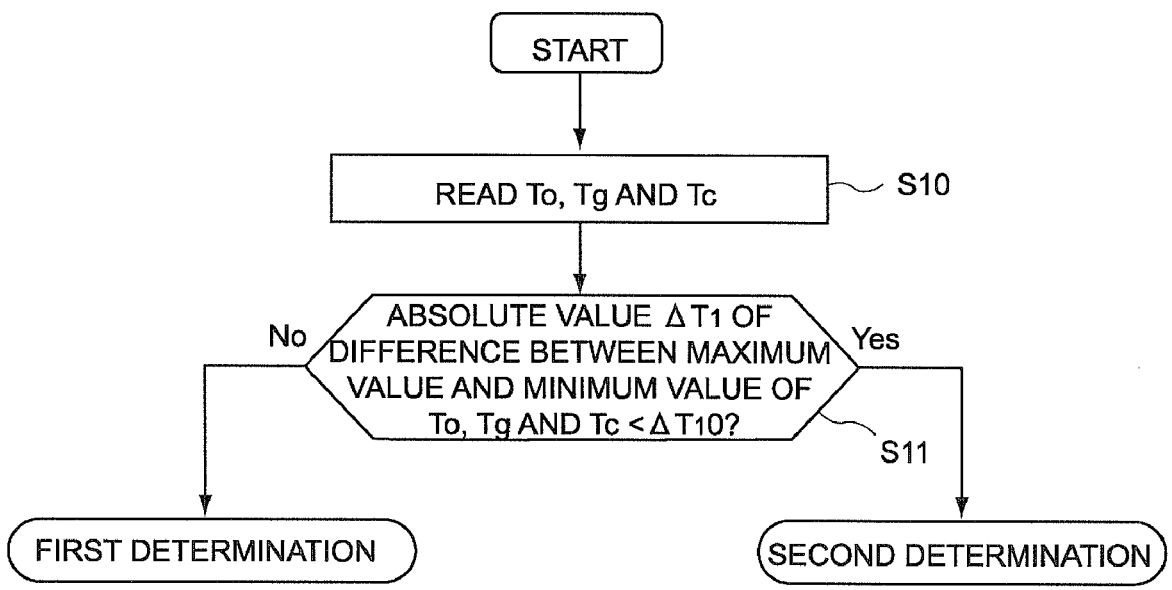
FIG. 4 is a flowchart for describing a determination method when an internal combustion engine starts at a low temperature.
Figure 5:
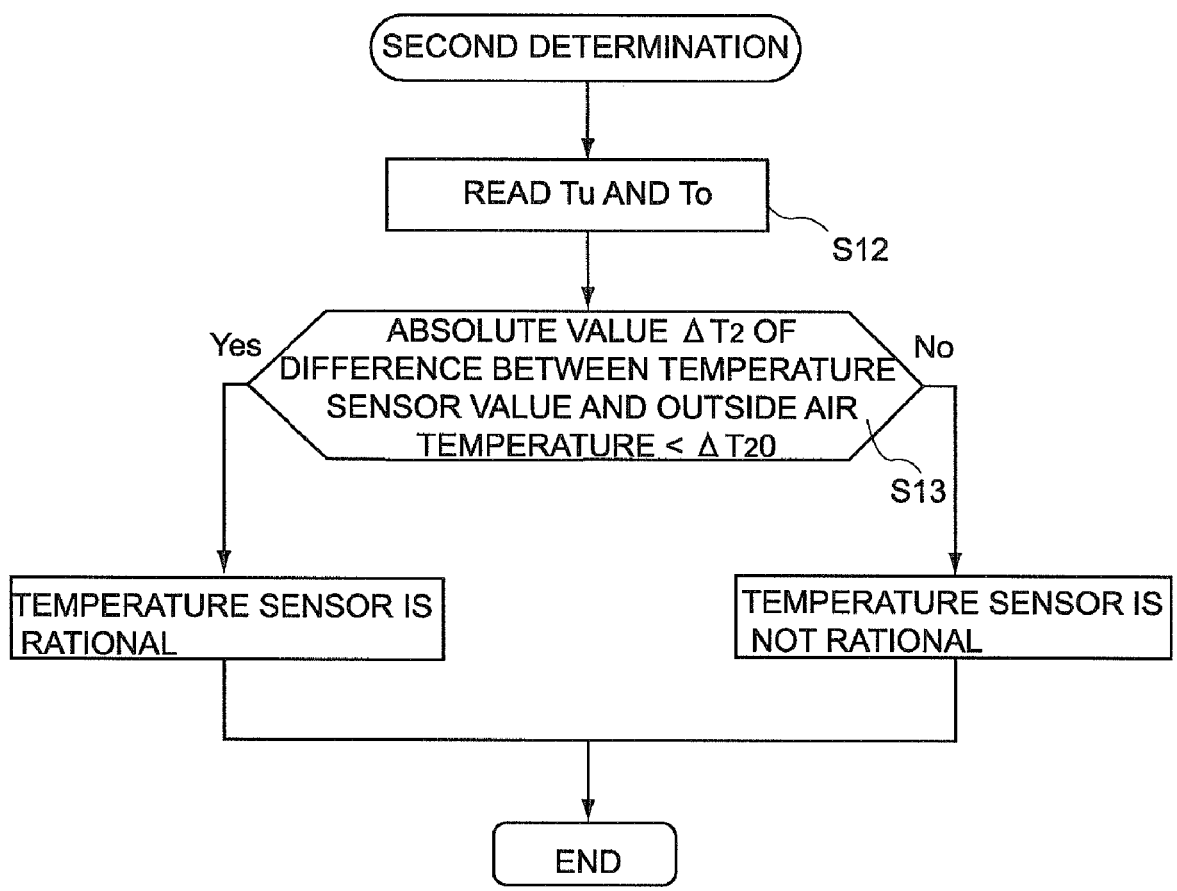
FIG. 5 is a flowchart for describing a second determination method.
Figure 6:
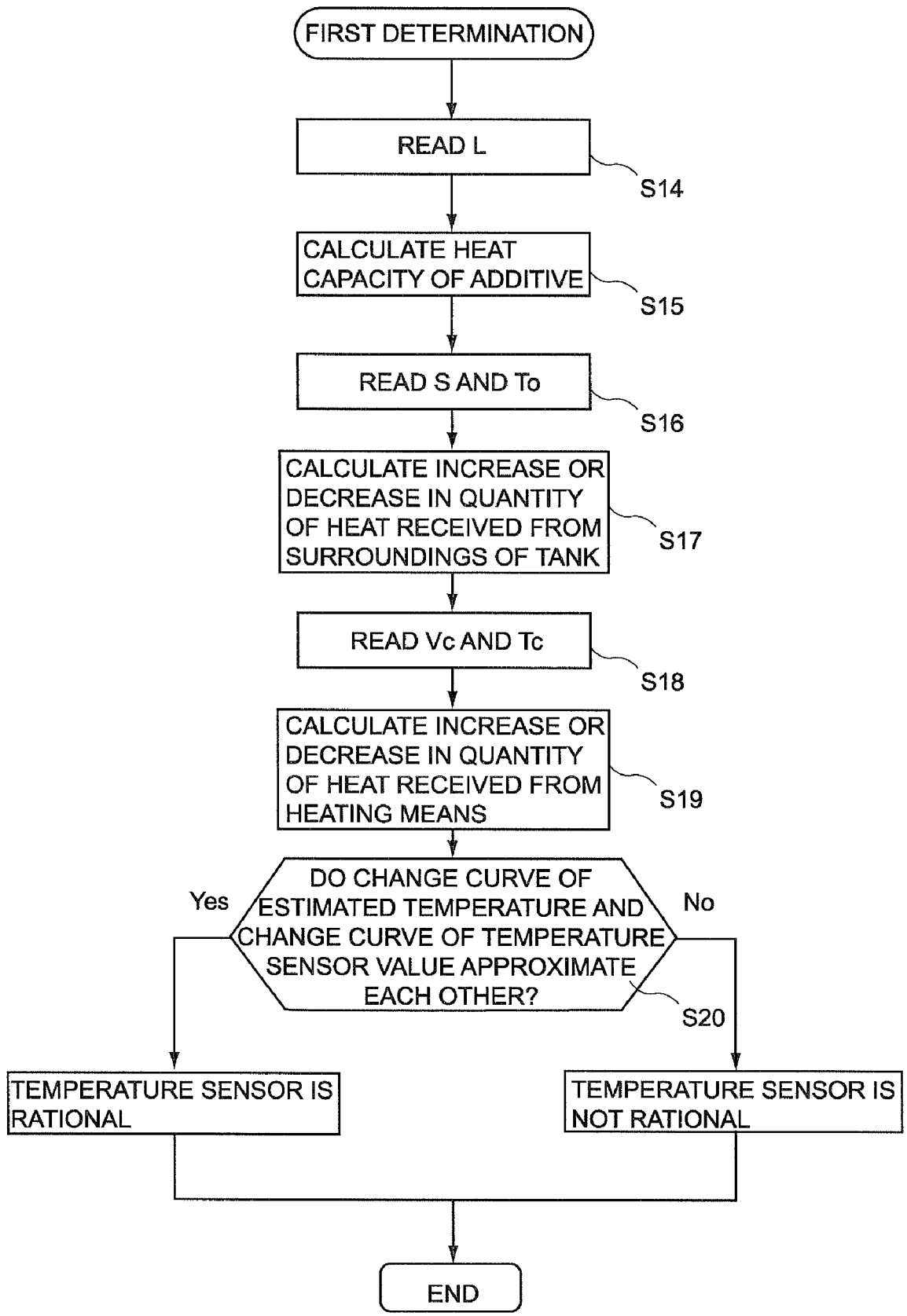
FIG. 6 is a flowchart for describing a first determination method.

First, as has already been described on the basis of FIG. 4, in steps S20 and S21, it is discerned whether or not the internal combustion engine is starting at a low temperature, and when the internal combustion engine is not starting at a low temperature, the routine proceeds to step S27 where the first determination described on the basis of FIG. 6 is performed, and when the internal combustion engine is starting at a low temperature, the routine proceeds to step S22 where the second determination already described on the basis of FIG. 5 is performed. When the routine proceeds to step S27, it is discerned in step S28 whether the result of the first determination is YES or NO and, in accordance with that result, it is determined whether or not the temperature sensor is plausible.

On the other hand, when the routine proceeds to S22 and the second determination is performed, the first determination is subsequently performed in step S23.

Next, in step S24, it is discerned whether the result of the first determination is YES or NO, and when the result is YES, it is determined that the temperature sensor is plausible regardless of the result of the second determination of step S22. This is because, when the internal combustion engine starts at a low temperature, in a case where the storage tank had been replenished immediately prior with the additive whose temperature greatly differs with respect to the outside air temperature, it is judged in the second determination that the temperature sensor is not plausible, but if the change curve of the estimated temperature and the change curve of the temperature sensor value approximate each other, it can be considered that the temperature sensor is plausible.

Conversely, in step S24, when the result of the first determination is NO, the routine proceeds to S25 where it is discerned whether the result of the second determination in step S22 is YES or NO. When the result of the second determination is NO, the result is considered to be one where the temperature sensor is not plausible in both the first and second determinations, so it is determined that the temperature sensor is not plausible.

On the other hand, when the result of the second determination is YES, the potential for the heating means to be faulty is high because the change curve of the temperature sensor value does not course along the estimated temperature despite the temperature sensor value and the outside air temperature having coincided with each other when the internal combustion engine starts at a low temperature, so a heating means fault flag is raised in step S26 and it is determined that the temperature sensor is plausible.

In the applied example described above, the reliability of the result of plausibility diagnosis of the temperature sensor when the internal combustion engine starts at a low temperature can be raised even more, and discernment can also be performed in regard to the potential for the heating means to be faulty.

The invention claimed is:

1. A temperature sensor plausibility diagnosis unit which, in an exhaust purification apparatus of an internal combustion engine that delivers an additive inside a storage tank to an exhaust pipe on an upstream side of a reduction catalyst and selectively reduces and purifies $NO_x$ in exhaust with the reduction catalyst, is for performing plausibility diagnosis of a temperature sensor disposed inside the storage tank, the temperature sensor plausibility diagnosis unit comprising:
an additive heat capacity calculating portion that calculates a heat capacity of the additive inside the storage tank;
a heat quantity variation calculating portion that calculates an increase or decrease in a quantity of heat that the additive inside the storage tank receives; and
a plausibility diagnosing portion that determines the plausibility of the temperature sensor by comparing an estimated temperature course of the additive estimated from the heat capacity of the additive and the increase or decrease in the quantity of heat with a sensor temperature course of the additive detected by the temperature sensor.

2. The temperature sensor plausibility diagnosis unit according to claim 1, wherein the heat capacity of the additive is calculated at least on a basis of a residual quantity of the additive inside the storage tank and a specific heat of the additive.

3. An internal combustion engine exhaust purification apparatus comprising the temperature sensor plausibility diagnosis unit according to claim 2.

4. The temperature sensor plausibility diagnosis unit according to claim 1, wherein the increase or decrease in the quantity of heat is calculated on a basis of the quantity of heat that the additive inside the storage tank receives from its surroundings and the quantity of heat that the additive inside the storage tank receives from heating means for heating the additive.

5. The temperature sensor plausibility diagnosis unit according to claim 4, wherein the quantity of heat that the additive inside the storage tank receives from its surroundings is calculated at least on a basis of an outside air temperature, a shape of the storage tank, and a heat transfer coefficient of the storage tank.

6. An internal combustion engine exhaust purification apparatus comprising the temperature sensor plausibility diagnosis unit according to claim 5.

7. An internal combustion engine exhaust purification apparatus comprising the temperature sensor plausibility diagnosis unit according to claim 4.

8. The temperature sensor plausibility diagnosis unit according to claim 1, wherein when determination of plausibility by comparison between the estimated temperature course and a sensor value temperature course is a first determination, the plausibility diagnosing portion obtains a difference between a maximum value and a minimum value of an outside air temperature, an exhaust temperature, and a temperature of cooling water of the internal combustion engine, performs the first determination when the difference is equal to or greater than a predetermined threshold, and performs a second determination where it determines the plausibility of the temperature sensor by comparing the sensor value of the temperature sensor with the outside air temperature when the difference is less than the predetermined threshold.

9. An internal combustion engine exhaust purification apparatus comprising the temperature sensor plausibility diagnosis unit according to claim 8.

10. An internal combustion engine exhaust purification apparatus comprising the temperature sensor plausibility diagnosis unit according to claim 1.

11. A temperature sensor plausibility diagnosis method which, in an exhaust purification apparatus of an internal combustion engine that delivers an additive inside a storage tank to an exhaust pipe on an upstream side of a reduction catalyst and selectively reduces and purifies $NO_x$ in exhaust with the reduction catalyst, performs plausibility diagnosis of a temperature sensor disposed inside the storage tank, the temperature sensor plausibility diagnosis method comprising:

determining the plausibility of the temperature sensor by comparing an estimated temperature course of the additive estimated from a heat capacity of the additive inside the storage tank and an increase or decrease in a quantity of heat that the additive inside the storage tank receives with a sensor temperature course of the additive detected by the temperature sensor.

* * * * *